United States Patent
Czapski, Jr. et al.

(10) Patent No.: US 9,551,294 B2
(45) Date of Patent: Jan. 24, 2017

(54) SLIDING NOZZLE FLAP ASSEMBLY

(71) Applicant: UNITED TECHNOLOGIES CORPORATION, Farmington, CT (US)

(72) Inventors: Joseph J Czapski, Jr., New Britain, CT (US); David C Pimenta, Rocky Hill, CT (US); Chung-Han Liou, Stoneham, MA (US); Paul R Senofonte, Jupiter, FL (US); Steven D. Roberts, Moodus, CT (US)

(73) Assignee: United Technologies Corporation, Farmington, CT (US)

( * ) Notice: Subject to any disclaimer, the term of this patent is extended or adjusted under 35 U.S.C. 154(b) by 360 days.

(21) Appl. No.: 14/155,802

(22) Filed: Jan. 15, 2014

(65) Prior Publication Data

US 2015/0192092 A1 Jul. 9, 2015

Related U.S. Application Data

(60) Provisional application No. 61/760,417, filed on Feb. 4, 2013.

(51) Int. Cl.
*F02K 1/06* (2006.01)
*F02K 1/09* (2006.01)

(52) U.S. Cl.
CPC . *F02K 1/06* (2013.01); *F02K 1/09* (2013.01); *F05D 2220/36* (2013.01); *F05D 2260/50* (2013.01)

(58) Field of Classification Search
CPC ............... F02K 1/06; F02K 1/08; F02K 1/09; F02K 1/72; F05D 2220/32; F05D 2260/50
See application file for complete search history.

(56) References Cited

U.S. PATENT DOCUMENTS

| | | | | |
|---|---|---|---|---|
| 2,608,053 | A | * 8/1952 | Davidson | F02K 1/09 138/45 |
| 3,312,916 | A | * 4/1967 | Hoover | F16H 35/10 200/47 |
| 8,511,973 | B2 | * 8/2013 | Ramlaoui | B64D 29/06 415/128 |
| 2009/0293226 | A1 | * 12/2009 | Widemark | F16C 17/10 16/2.1 |
| 2010/0206163 | A1 | * 8/2010 | Mizutani | C23C 18/165 92/169.1 |
| 2011/0297758 | A1 | 12/2011 | Sanchez et al. | |

* cited by examiner

*Primary Examiner* — Arun Goyal
(74) *Attorney, Agent, or Firm* — Bachman & LaPointe, P.C.

(57) ABSTRACT

Tracks (35), fastened to static structure of an aircraft engine nozzle, guide sliders (32) journaled in struts (27, 28) fastened to a flap (23) of the nozzle. Each slider and attached journal axle or bolt (33) is formed of cobalt, and each track slider surface (61) and journal bushings (43, 44) are formed of a nickel alloy to reduce wear from rubbing. Track slides (40, 41) are mounted to the static structure of the nozzle by blind bolts (68) having a tool recess (70) at its threaded tip to prevent the bolt (68) from turning as a nut is secured. Each slider has limited rotation due to a pin (102), thereon engaging a slot in a tab (100) of the bushing (43) to assist in inserting the slider (32) into the beveled ends of the tracks (35, 36), when mounting or replacing a flap.

10 Claims, 4 Drawing Sheets

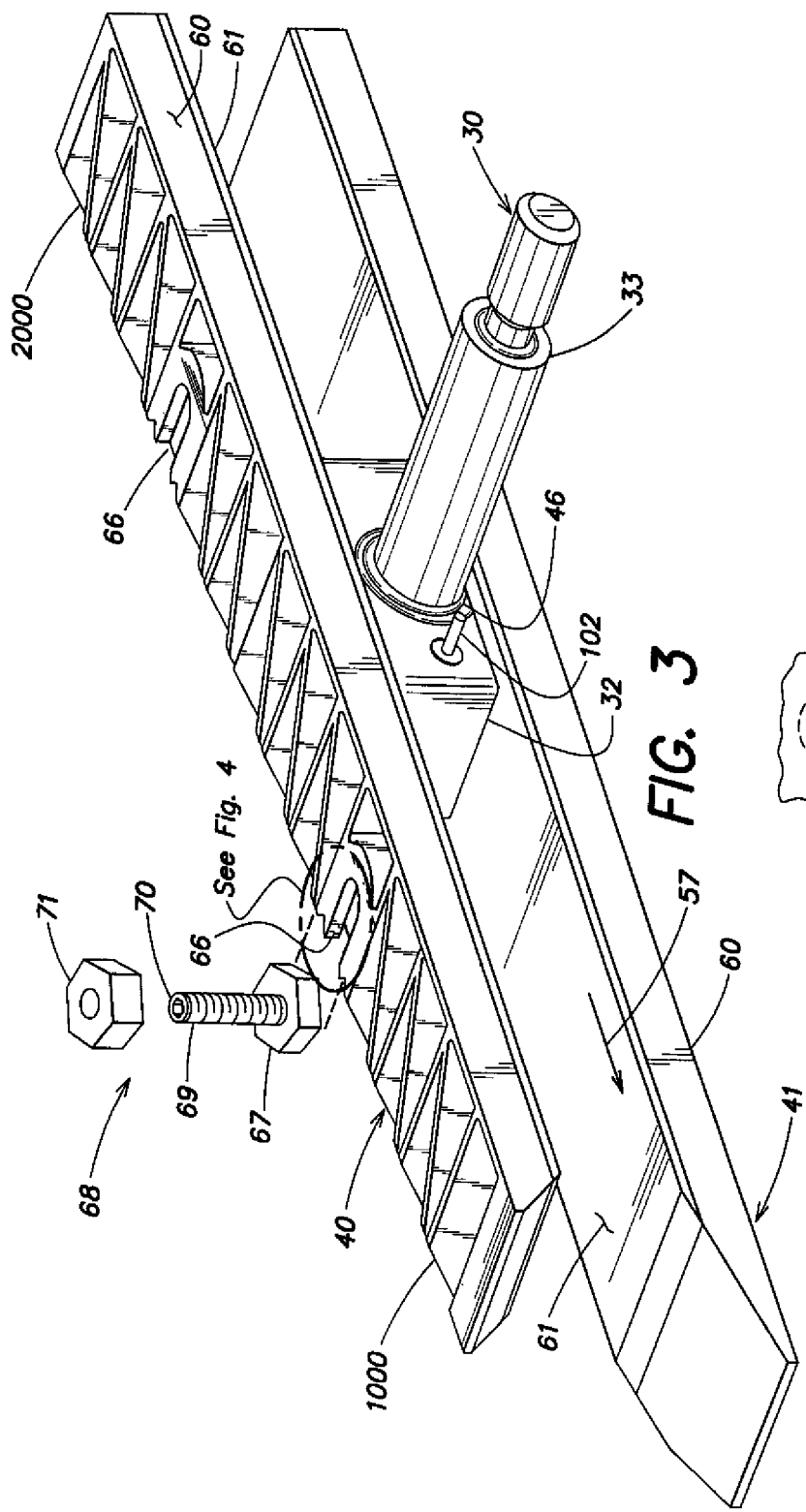

SLIDING NOZZLE FLAP ASSEMBLY

This disclosure was made with Government support under Contract No. F33657-03-C-2011 awarded by the United States Air Force. The Government has certain rights in this disclosure.

TECHNICAL FIELD

A sliding nozzle flap assembly for large turbofan aircraft engines is guided in tracks by rectangular, nickel alloy sliders journaled to flap support struts in cobalt alloy bushings, the track contacting surfaces thereof being crowned with a radius having an apex parallel with the direction of slider motion. Cobalt alloy sliding surfaces of the tracks provide minimum wear from rubbing by the sliders. Bolts having a hexagonal bore at the thread end permit fastening the liners to the track frame without passing through the liner surface. Installation and/or replacement of flaps is enhanced by beveled ends of the tracks, and tabs on the journals limiting rotation of sliders.

BACKGROUND

It is conventional to use a plurality of individually movable flaps to form nozzles at the exhaust end of large turbofan aircraft engines. The flaps are typically pushed or pulled in an omnidirectional sense, the movement being guided by two or more tracks within which a sliding element disposed on the flap will translate so as to define the flap's motion. An example is patent publication US 2011/0297758. In that publication, a slider block slides within tracks, but it is also known to utilize rollers which roll within tracks. The blocks or rollers and tracks provide a guided constraint when the flaps are commanded to move in response to a change of the nozzle area ratio or when nozzle vectoring (steering of the aircraft) is required. However, excessive wear of the tracks and the elements that slide within them has been noted.

SUMMARY

An aircraft engine nozzle flap is moveable between first and second positions by at least one flap positioning arm. A plurality of guidance struts are attached to the flap and the other end of each strut has a bore. A plurality of guidance tracks are secured to the static structure of the nozzle, each having two, spaced apart longitudinal sliding surfaces. A plurality of track sliders are each disposed in a related one of the tracks, each rigidly connected to an axle journaled in the bore of the corresponding strut. Each slider has a first axis parallel with the axis of the axle and defining the width of the slider, each has a second axis perpendicular to the first axis and parallel with the longitudinal sliding surfaces of the corresponding tracks and defining the length of the slider, and each has a third axis perpendicular to the first and second axes and defining the thickness of the slider. The top and bottom surfaces, defined by the width and the length of the slider, each have a crown with an apex parallel with the second axis to provide a single line of contact with the corresponding sliding surface.

The crowns may have a radius of curvature between 3.0 and 4.0 times the height of the slider, the slider may be at least about twice as long as it is thick, and the intersections of the surfaces of the slider may be rounded off. The slider and axle may comprise a nickel alloy and the surfaces of the tracks which are contacted by the slider may comprise a cobalt alloy.

The bore of each strut may have at least one bushing in contact with the axle of the related slider, and the axles may comprise a nickel alloy and the bushings may comprise a cobalt alloy. A vibration dampening curved spring washer may be disposed on each axle on a side of the related strut adjacent to the slider. Each axle may be threaded and secured to the related strut (27, 28) with a threaded nut.

An aircraft engine nozzle flap is moveable between first and second positions by at least one flap positioning arm. A plurality of guidance tracks disposed on the static structure of the nozzle each have longitudinal sliding surfaces. A plurality of guidance struts have one end attached to the flap and the other end having a bore, with a plurality of track sliders, each rigidly connected to an axle journaled in the bore of a corresponding strut, and each slider disposed in a related one of the tracks, wherein the sliding surfaces comprise a cobalt alloy and the sliders comprise a nickel alloy. The nickel alloy axle may be journaled in a cobalt alloy bushing.

An aircraft engine nozzle flap is moveable between first and second positions by at least one flap positioning arm. A plurality of guidance tracks disposed on the static structure of the nozzle each have longitudinal sliding surfaces. A plurality of guidance struts have one end attached to the flap and the other end having a bore. A plurality of track sliders are each rigidly connected to an axle journaled in the bore of a corresponding strut, and each slider is disposed in a related one of the tracks. The tracks each comprise a frame secured to the static structure of the nozzle and having track liners comprising a sub-structure with the sliding surfaces disposed thereon, each sub-structure has a plurality of slot pairs for capturing a blind bolt with a thread-end tool recess for bolting the track liners to the frame.

Other variations will become more apparent in the light of the following detailed description of exemplary embodiments, as illustrated in the accompanying drawings.

BRIEF DESCRIPTION OF THE DRAWINGS

FIG. 3 is a partial, perspective view of a slider and track assembly in accordance herewith.

FIG. 4 is a fractional top view of bolt slots in the tracks of FIG. 3.

MODE(S) OF IMPLEMENTATION

Figure 1:
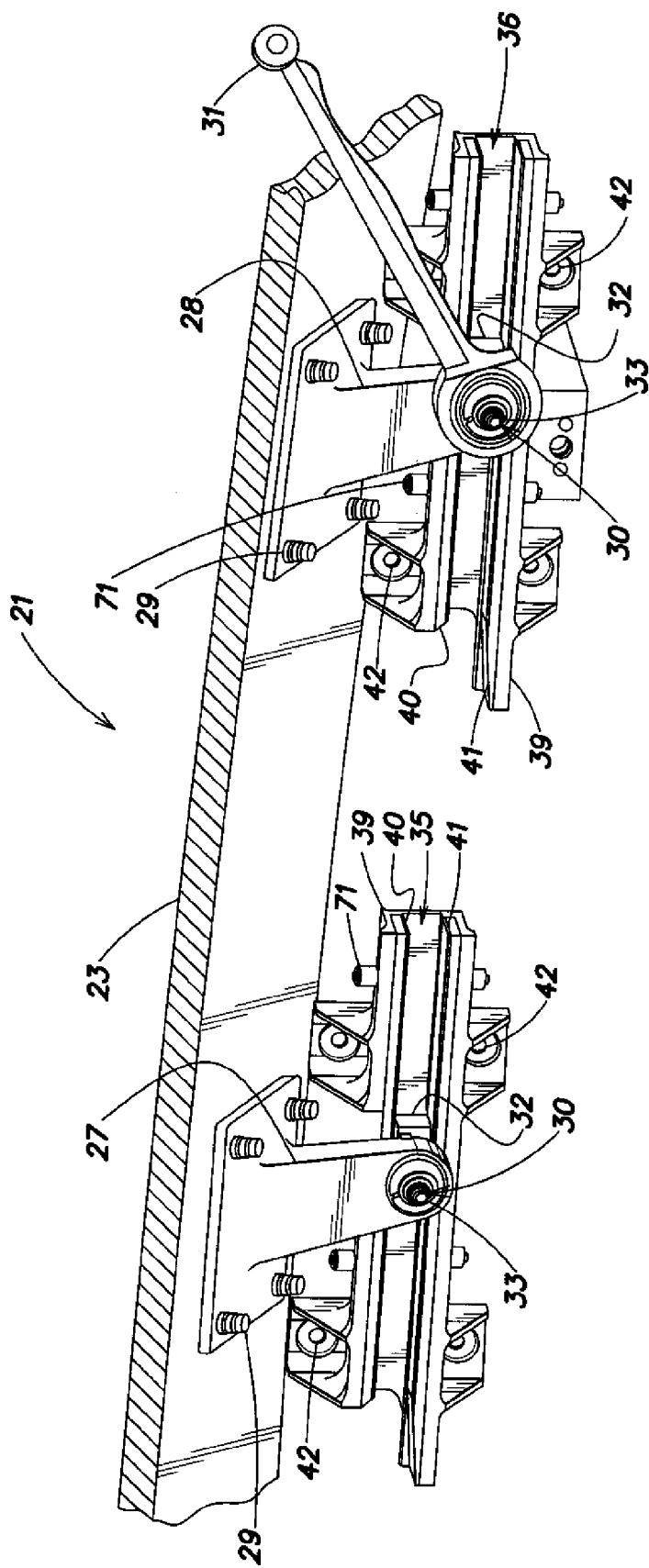
FIG. 1 is a front partially sectioned and fragmented, perspective view of a right-hand portion of an aircraft engine nozzle flap, mounted to a nozzle by tracks, facing inwardly, which guide sliders in accordance herewith.

An aircraft engine nozzle flap assembly 21 illustrated in FIG. 1 includes a nozzle flap 23 having a pair of guidance struts 27, 28 securely fastened thereto such as by means of bolts 29. A slab head shoulder bolt 30 is journaled within each strut 27, 28, and includes a rectangular slider 32 contiguous with a bolt 33 which serves as an axle, as illustrated more clearly in cross section in FIG. 2, and in FIG. 3. The sliders 32 can translate, in response to a positioning arm 31, along tracks 35, 36 which consist of a frame 39 and a pair of track liners 40, 41. The flap will have, in practice, at least two more track/slider assemblies, on a left-hand side, also facing inwardly. The frames 39 are bolted to the static structure of the nozzle through holes 42. The slab head shoulder bolt 30 and the positioning arm 31 are separately journaled in the support strut 28. The bolt portion 33 associated with the strut 28 is longer than that associated with strut 27.

Figure 2:
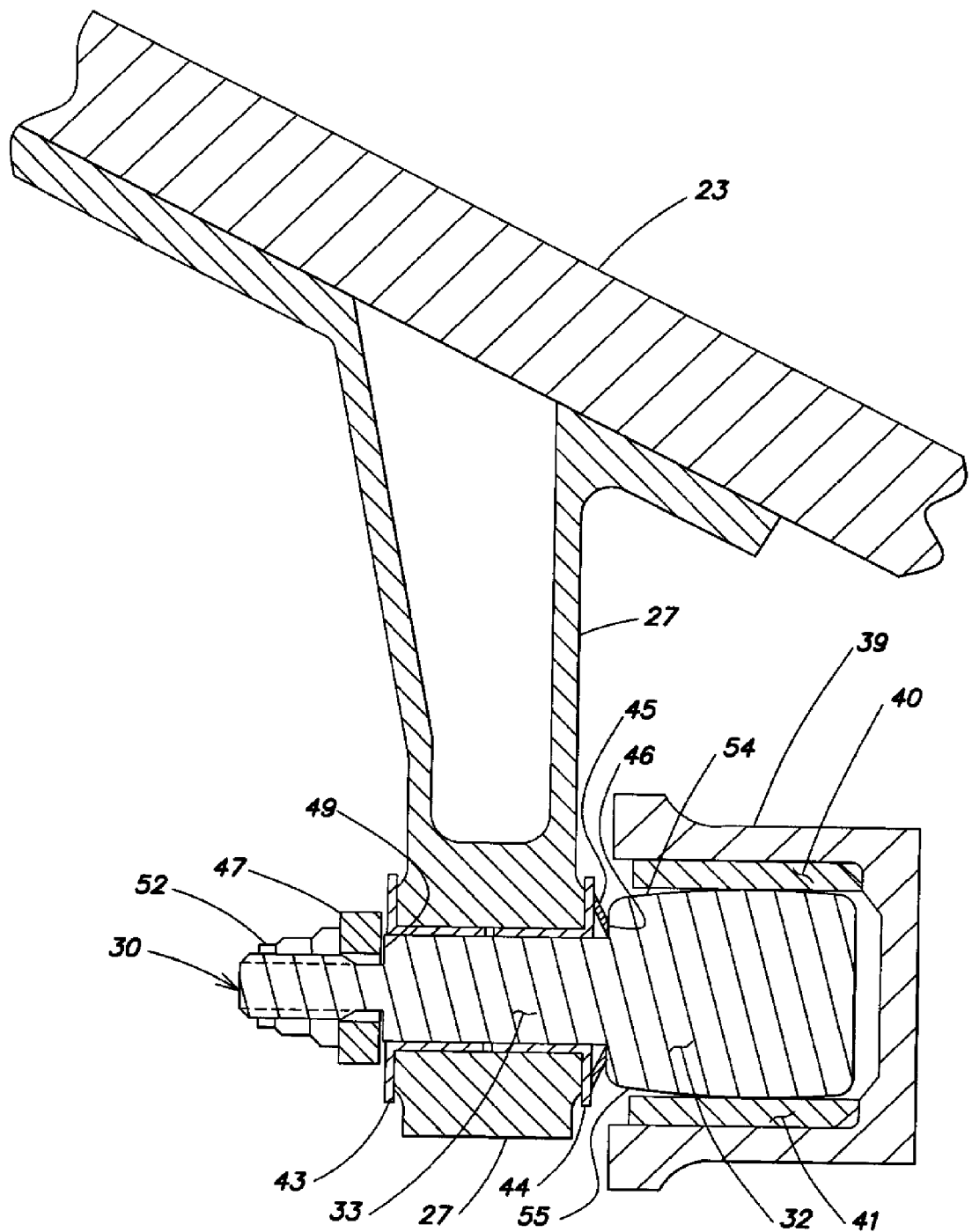
FIG. 2 is a fractional cross section of a journaled slider and track assembly of FIG. 1.

Referring to FIG. 2, the axle or bolt portion 33 of the slab head shoulder bolt 30 is journaled within a two-piece, split bushing 43, 44 mounted within a bore of the strut 27. A curved spring washer 45, of relatively low strength, is interposed between a shoulder or boss 46 on the bolt 32 and the bushing 44. A clearance of about 0.05 mm (0.002 inches) is provided so that when vibration occurs, the spring 46 can assist in dampening it. This clearance is assured by a flat washer 47 which is urged against a boss 49 on the bolt 33 by a nut 52, which may be a lock nut if desired in any case. For minimum wear, the bolt 33 is a nickel alloy, such as INCONEL® 718 alloy, and the bushings 43, 44 are a cobalt alloy, such as STELLITE® 6b. The boss limits the position of the flap, restricting further motion to the right in FIG. 2.

The slider portion 32 of the slab head shoulder bolt 30 has upper and lower faces 54, 55 which are crowned with an apex parallel with the longitudinal direction of the tracks, having a radius of curvature several times the thickness (top to bottom as viewed in FIG. 2) of the slider. This provides only a single line of contact of each surface 54, 55 of the slider 32 and the track liners 40, 41 to minimize Hertzian sub-surface stress. The crowned surfaces 54, 55 of the slider allows it to rotate in either direction a few degrees, such as about ±5°, on an axis parallel with arrow 57 (FIG. 3) while still maintaining single-line contact between the crowned surfaces 54, 55 and the track liners 40, 41.

The length of the slider, along the longitudinal direction of the tracks 35, 36 (see arrow 57), is about twice as great as its width (along the bolt axis) to prevent tipping about the bolt axis that could result in the slider 32 digging in or tripping up on the track liners 40, 41. In addition, all of the corners, that is, all of the intersections between any of the six faces of the sliders, are rounded to avoid catching or tripping up.

Referring to FIG. 3, the track liners 40, 41 each comprise an isogrid sub-structure 60 and a sliding surface 61. The sub-structures 60 are typically formed of titanium, for lightness. The sliding surfaces 61 are formed of a cobalt alloy, such as STELLITE® 6b, for achieving lowest wear with the nickel alloy slider 32. Choice of these two materials results in very low wear from rubbing compared to other materials which might be used.

The long length of the slider 32 (as compared with a roller having its axis the same as that of the slab head shoulder bolt 30) provides a large surface area, even though the crown of the top and bottom surfaces present only a single line of contact with the surfaces 61. The large contact area results in lower Hertzian subsurface stresses.

The track liners 40, 41 include a blind bolt, captive fastener arrangement, with a thread-end tool recess similar to an EDDIE® bolt. As illustrated, there are two pairs of slot sets 64, 66 on each track 40, 41. An outer slot 64, visible in FIG. 3, is only large enough to receive the shank 67 of a bolt 68. A larger slot 66 not visible in FIG. 3 but illustrated in FIG. 4 allows the head 69 of the bolt to move to a position where the head of the bolt is captured. The bolt 68 has, at its threaded end, a hexagonal (or other polygonal) tool recess 70 by means of which a tool can prevent the bolt 68 from turning as a nut 71 is secured. Generally, lock nuts are utilized, or lock washers may be used with standard nuts.

The sliding surfaces 61 may be flame sprayed or otherwise eutectically coated onto the isogrids 60.

Figure 5:
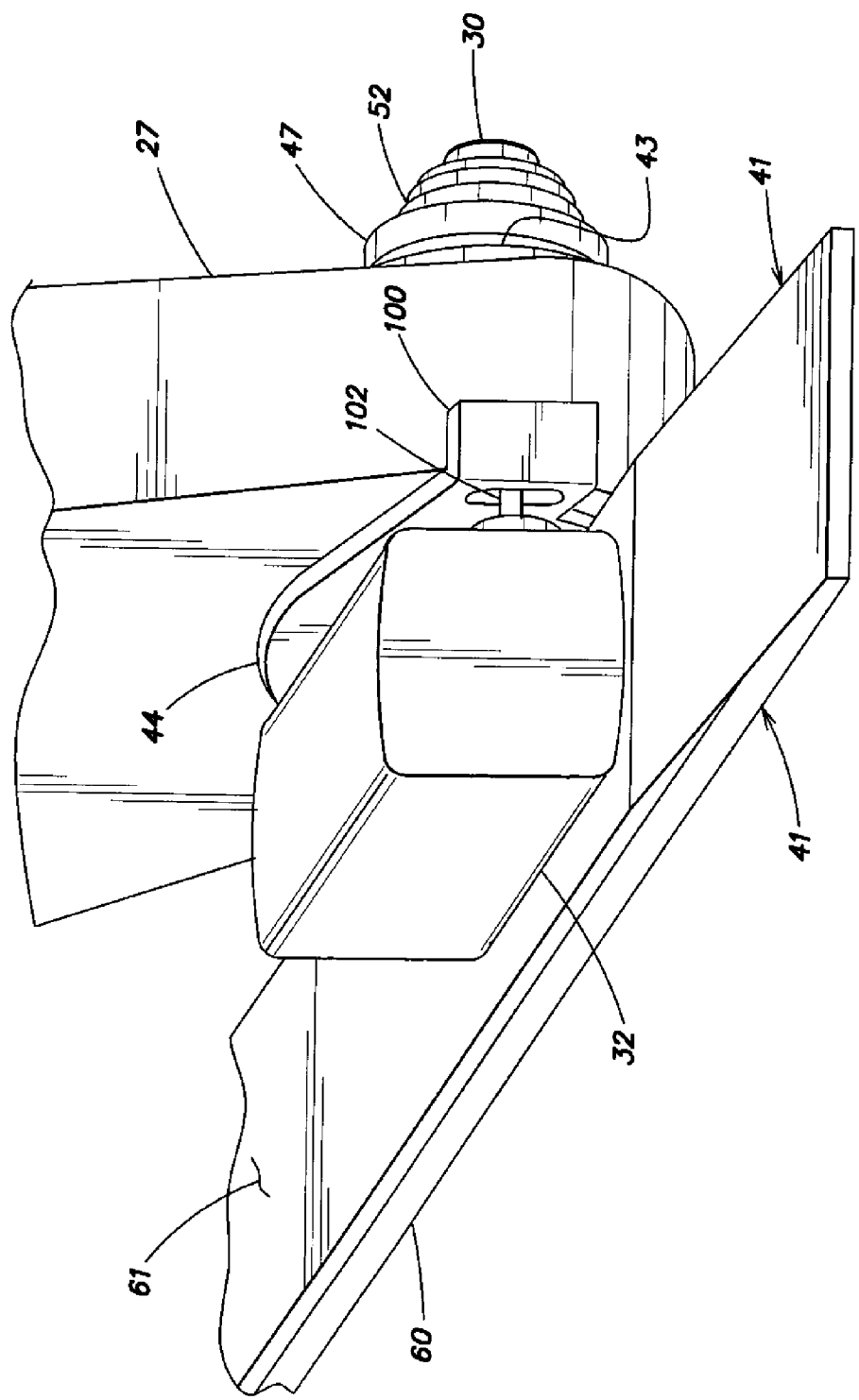
FIG. 5 is a partial rear perspective view of the slider of FIG. 1 with its pin engaged in the tab of a bushing.

FIG. 5 is a rear view of the strut 27 showing that the bushing 44 has a tab 100 thereon which is bent over the strut 27 so as to prevent rotation thereof. A pin 102 (FIG. 3) disposed on the slider 32 is captured in a slot in the tab 100. The slot in the tab 100 allows the pin sufficient vertical motion so that the slider 32 can rotate about the axis of the bolt 33 plus or minus only a few degrees.

For installation (or replacement), the bolts 68 disposed in the slots 64, 66 of the track liners 40, 41 secure the liners to the tracks 35, 36 which are then bolted to the frames 39. The frames 39 are bolted through the holes 42 to the static structure of the nozzle. The flap 23 will have two or more struts 27, 28 bolted thereto, with the slab head shoulder bolts 30 and the positioning arm 31 journaled in them. Then, sliding the sliders into the tracks completes the mounting of the flap 23 to the static structure of the nozzle. The flap can be inserted by sliding the sliders 32 into the tracks 35, 36, from the left side toward the right side (in this embodiment) as seen in FIG. 1 and FIG. 3. The left ends of the track liners 40, 41 are chamfered to facilitate insertion of the sliders 32 with ease. The pin 102 on each slider (FIG. 3) engages the tab 100 (FIG. 5) on the split bushing 44 to keep the slider 32 relatively parallel to the flap 23 during assembly into the tracks 35, 36. Without the tab 100 and the pin 102, nothing would restrain the sliders from assuming any particular position not useful in the assembly process.

Since changes and variations of the disclosed embodiments may be made without departing from the concept's intent, it is not intended to limit the disclosure other than as required by the appended claims.

The invention claimed is:

1. Apparatus (21) for an aircraft engine nozzle, comprising:
    an aircraft engine nozzle flap (23) moveable between first and second positions;
    at least one flap positioning arm (31) for moving the aircraft engine nozzle flap between the first and second positions;
    a plurality of guidance struts (27, 28), one end of each said plurality of guidance struts attached to the aircraft engine nozzle flap and another end of each said plurality of guidance struts having a bore;
    a plurality of guidance tracks (35, 36), each one of the plurality of guidance tracks secured to a static structure of the nozzle, each of said plurality of guidance tracks having two, spaced apart longitudinal sliding surfaces (61); and
    a plurality of track sliders (32), each disposed in a related one of the plurality of guidance tracks, each of the plurality of track sliders rigidly connected to an axle (33) journaled in the bore of corresponding said plurality of guidance struts, each of the plurality of track sliders having a first axis parallel with an axis of the axle and defining a width of each of the plurality of track sliders, each of the plurality of track sliders having a second axis perpendicular to the first axis and parallel with the longitudinal sliding surfaces of corresponding said plurality of guidance tracks and defining a length of each of the plurality of track sliders, and each of the plurality of track sliders having a third axis perpendicular to the first axis and the second axis and defining a thickness of each of the plurality of track sliders; characterized:
    top and bottom surfaces (54, 55) defined by the width and the length of each of the plurality of track sliders each having a crown with an apex parallel with the second axis to provide a single line of contact with a corresponding said longitudinal sliding surfaces.

2. Apparatus (21) according to claim 1 further characterized in that:
each of the crown has a radius of curvature between 3.0 and 4.0 times the height of the slider (32).

3. Apparatus (21) according to claim 1 further characterized in that:
the plurality of track sliders (32) is at least about twice as long as it is thick.

4. Apparatus (21) according to claim 1 further characterized in that:
the intersections of the top and bottom surfaces of each of the plurality of track sliders (32) are rounded off.

5. Apparatus (21) according to claim 1 further characterized in that:
each of the plurality of track sliders (32) and axle (33) comprise a nickel alloy and the longitudinal sliding surfaces (61) of the plurality of guidance tracks which are contacted by each of the plurality of track sliders comprise a cobalt alloy.

6. Apparatus (21) according to claim 1 further characterized in that:
the bore of each said plurality of guidance struts has at least one bushing (43, 44) in contact with the axle (33) of related each of the plurality of track sliders (32).

7. Apparatus (21) according to claim 6 further characterized in that:
the axles (33) comprise a nickel alloy and bushings (43, 44) comprise a cobalt alloy.

8. Apparatus (21) according to claim 6 further characterized by:
a vibration dampening curved spring washer (45) disposed on each of the axle (33) on a side of related said plurality of guidance struts (27, 28) adjacent to each of the plurality of track sliders (32).

9. Apparatus (21) according to claim 1 further characterized in that:
each of the axle (33) is threaded and secured to related said plurality of guidance struts (27, 28) with a threaded nut (52).

10. Apparatus (21) according to claim 1 further characterized by:
the plurality of guidance tracks (35, 36) each comprising a frame (39) secured to the static structure of the nozzle and having track liners (40, 41) each comprising a sub-structure (60) with the longitudinal sliding surfaces (61) disposed thereon, each sub-structure having a plurality of slot pairs (64, 66) for capturing a blind bolt (68) with a thread-end tool recess (70) for bolting the track liners to the frame.

* * * * *